May 1, 1934.  H. L. BLUM  1,956,788
DRINK MIXER AND DISPENSER
Filed Nov. 30, 1932
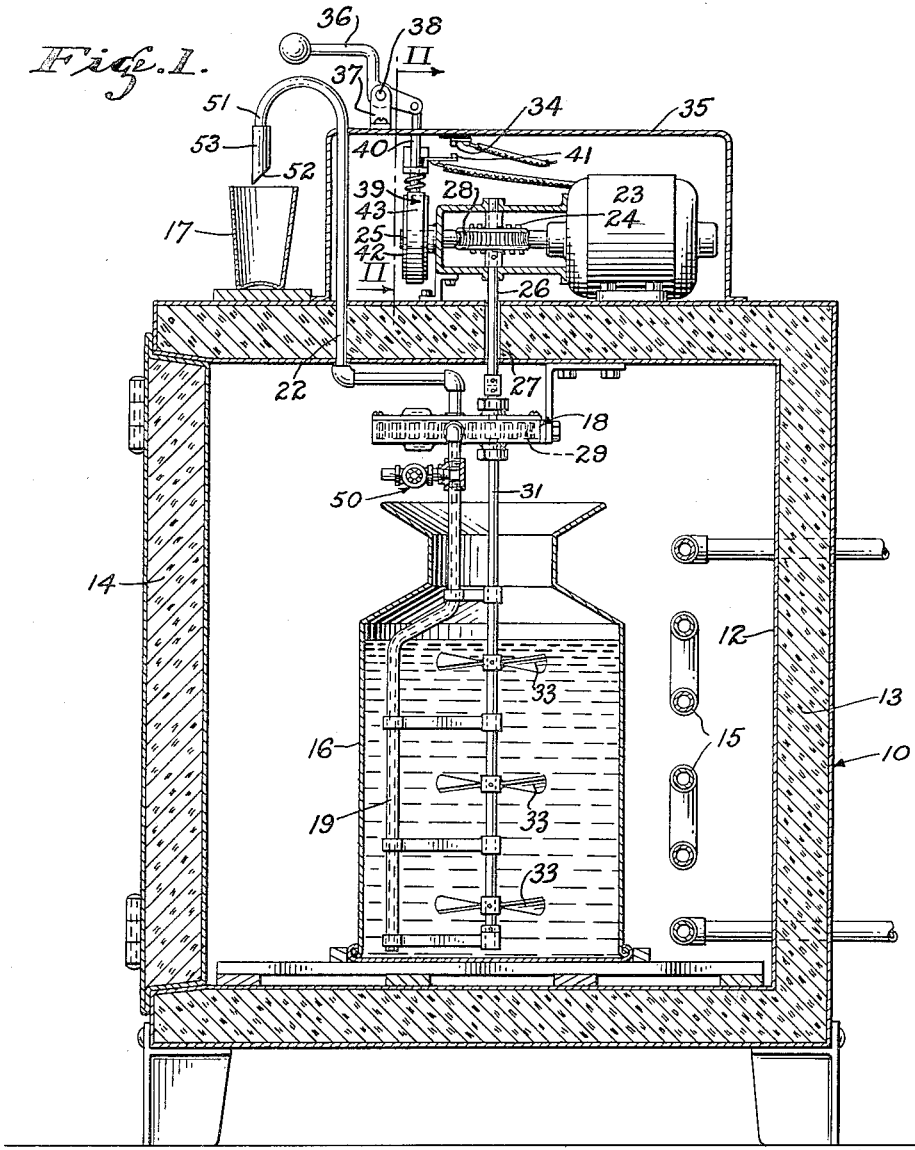
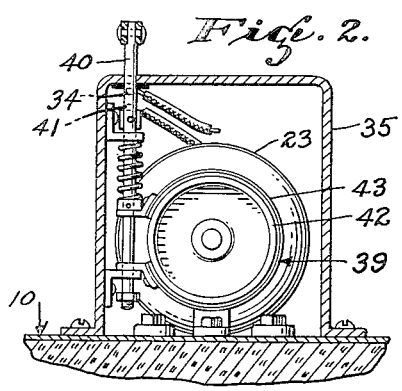
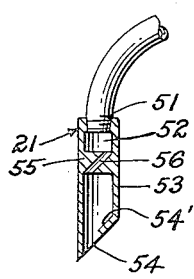
INVENTOR.
Hosmer L. Blum.
BY
ATTORNEY Patented May 1, 1934

1,956,788

UNITED STATES PATENT OFFICE 1,956,788

DRINK MIXER AND DISPENSER

Hosmer L. Blum, San Francisco, Calif.

Application November 30, 1932, Serial No. 644,940

13 Claims. (Cl. 225—21)

This invention relates to a drink mixer and dispenser, and more particularly to an improved device for dispensing liquid from a supply container while subjecting the liquid to a treatment during the dispensing operation.

It is one object of this invention to provide an improved drink mixer and dispenser.

Another object is to provide a drink mixer and dispenser having novel means for simultaneously mixing and dispensing a liquid from a supply container and in aerating the liquid during the dispensing operation.

Another object is to provide in a device for simultaneously mixing and dispensing liquids, novel means for agitating and aerating the liquid during the dispensing operation, that shall be simple in structure, efficient, easy to operate, durable and comparatively cheap to manufacture.

A further object is to provide a novel drink mixer and dispenser, wherein a geared pump is employed for simultaneously aerating and agitating the liquid mixture during the dispensing operation.

The above and other objects will be made apparent throughout the further description of the invention, when taken in connection with the accompanying drawing, wherein like reference characters refer to like parts. It is to be distinctly understood that the drawing is not a definition of the invention, but is merely one form of an apparatus for carrying out the invention as defined by the appended claims.

In the drawing:—

Fig. 1 is a vertical sectional view of an apparatus embodying the invention.

Fig. 2 is a sectional view taken on the line II—II of Fig. 1, and

Fig. 3 is a detail sectional view of one form of an improved dispensing nozzle embodying the invention.

One form of the invention comprises a refrigeration or cooling compartment, a liquid supply container disposed therein, means for simultaneously mixing, aerating and dispensing the liquid from the supply container to a serving container, means for regulating the aerating operation, and novel means for actuating the mixing, agitating, aerating and dispensing device.

In the form shown, 10 indicates, in its entirety, a refrigerating or cooling compartment which may be a portion of a refreshment fountain, the bottom, top and side walls of which may be constructed of metal plates 11 and 12, the plates 11 and 12 being spaced apart and having a heat insulating material 13, which may be cork, interposed therebetween for the well known purpose.

The compartment 10 may be provided with a suitable door 14, in the wall thereof, for rendering access to the compartment.

Suitable refrigerating means is provided for maintaining the compartment at a desired temperature, which means may consist of expansion coils 15. The expansion coils 15 may be disposed in a semi-circular manner and adapted to receive and surround a liquid container 16. The compartment may be of sufficient size and having expansion coils 15 arranged to accommodate a plurality of supply containers 16. The supply container 16, here illustrated, is of the conventional milk can type, and is employed to contain a supply of a liquid, which may be a ready mix drink solution.

Novel means is provided for agitating, aerating and dispensing desired amounts of the ready mixture from the container 16 to a serving glass 17, which means comprises a conventional geared pump 18. The inlet of the pump 18 is connected to a point adjacent the bottom of the container 16 by a conduit 19, and the outlet of the pump 18 is connected to a dispensing nozzle, represented in its entirety by 21, by conduit 22.

The geared pump 18 is preferably driven by an electric motor 23, the latter being provided with a worm 24, carried by one end of the motor shaft 25. The motor 23 is preferably mounted on top of the compartment 10, and connected to drive the pump 18 by way of a vertical shaft 26, extending through an opening 27 provided in the top of the compartment 10. The upper end of the shaft 26 is provided with a worm gear 28 for meshing with the worm 24 on the motor shaft 25; the shaft 26 extending through the pump 18 and adapted to drive the power gear 29 of the pump 18.

Depending from the pump 18 is a shaft 31 which may be a continuation of the shaft 26. The shaft 31 is adapted to extend downwardly into the container 16, and is provided with a plurality of propellers or agitating members 33, the latter adapted to agitate the liquid in the container 16 during operation of the pump 18.

Means are provided for energizing the motor 23, which means may consist of electrical contacts 34 mounted within the housing 35, the latter being mounted on the top of the compartment 10, and employed for covering and concealing the motor and its associated geared mechanism. An actuating handle 36, which may be mounted on top of the housing 35 is shown at 37, and adapted to turn about a pivot 38 disposed intermediate its ends. The lowermost end of the handle 36 is connected to a brake mechanism 39 by connecting means 40. The latter may be provided with electrical contact members 41 for engaging the contact members 34, the contact members 34 being electrically connected to any suitable source of power, and the contact members 41 being connected to the motor 23. It will be seen, therefore, that upon turning the handle 36 in a counter clockwise direction, that the contact members 41 will be raised into contact relation with the cooperating contact members 34 for energizing the motor 23.

The brake mechanism 39 may consist of a brake drum 42 fixed to the end of the power shaft 25, and having disposed thereabout a brake band 43, the latter being normally in braking contact with the drum 42, and connected to the connecting means 40, whereby upon turning the handle 36 in a counter clockwise direction, the brake band 43 will be released from the drum 42 and render the motor free to operate, when energized, by the cooperating contact members 34 and 41, during the upward movement of the contact members 41 and connecting means 40, as the handle 36 is turned in a counter clockwise direction. It will be seen, therefore, that the handle 36 is normally biased in a clockwise direction, and that the contact members 34 and 41 are normally in a separated position while the brake mechanism is normally in braking relation with the motor. Therefore, it follows that upon actuating the handle 36 in a counter clockwise direction that the brake mechanism 39 will be released simultaneously with the making of the electrical contact between the cooperating contact members 34 and 41.

Novel means is provided for utilizing the geared pump for agitating and aerating the liquid passing therethrough, which means consist of a valve 50 disposed in the conduit 19 adjacent the inlet of the pump 18. The valve 50 is adapted to permit a predetermined amount of air into the conduit 19 in response to the action of the pump 18. The valve 50 may be of any suitable type, such as a valve having a valve stem and actuating wheel, as shown in the drawing. The valve 50 is illustrated in Fig. 1 as a valve of the conventional adjustable type, wherein the valve stem may be actuated for adjusting the valve passageway for regulating the amount of air passing therethrough. Also the valve 50 may be of any of the other conventional types of valve, such as a one-way valve. The air delivered to the valve 50 may be the surrounding air within the cooling compartment 10, or it may be provided from any other suitable source from which it has been cooled or compressed.

The admission of air within a pump line has heretofore been considered detrimental to the principle of pumping fluids. In many cases considerable expensive apparatus is employed for removing air columns from the liquid line. However, it has been found, by experiment, that in this particular art of agitating and aerating a liquid for refreshment purposes, that the admission of a predetermined amount of air to a liquid feed line of a geared pump operates to efficiently agitate and aerate the liquid passing through the pump. Also that such a structure is particularly desirable in view of the comparatively cheap manufacturing cost to produce an efficient drink mixer and dispenser.

This device eliminates the necessity of a compressor and does not only render the device cheaper to manufacture but conserves considerable space and renders the device portable, whereby it may be readily moved from one location to another.

The outlet of the conduit 22 is provided with a novel nozzle 21 having an opening 51 in the top thereof for receiving the outlet end of the conduit 22, and connecting the conduit 22 with the chamber 52 formed within the nozzle 21. The outlet end of the nozzle consists of an elongated portion 53 and terminating in a bevel portion 54, the latter being partly closed by a baffle or flange 54'. The chamber 52 of the nozzle 21 is separated from the elongated portion 53 of the nozzle by means of a partition 55, the latter being provided with an inclined passageway 56 for directing the liquid passing therethrough against the side walls of the elongated tubular member 53. The liquid is again interrupted by impinging against the baffle or flange 54', whereby the liquid passing through the nozzle 21 is further agitated.

The operation of the device is as follows:— The actuating handle 36 is turned in a counter clockwise direction about its pivot 38, for releasing the brake mechanism 39 on the motor shaft 25, and contacting the contact members 34 and 41 for energizing the motor. The handle is held in a counter clockwise position until the desired amount of the finished product is dispensed through the nozzle 21, at which time the handle 36 is released, and since it is normally biased by the brake mechanism through the connecting means 40 to a counter clockwise position, it will immediately seek its normal position, and during which movement the motor will be de-energized by the breaking of the associated contact members 34 and 41, and the brake mechanism 39 will assume its normal braking relation with the drum 42 of the motor shaft 25.

While I have illustrated and described but one form of a device for carrying out the invention, it will be apparent to those skilled in the art that certain changes, modifications, substitutions, additions and omissions may be made in the structure without departing from the spirit and scope of the invention as defined by the appended claims.

I claim:—

1. A device for aerating liquids in the course of dispensing a liquid, comprising a conduit member having an inlet opening adapted for submergence in a liquid supply and an outlet opening from which liquid may be dispensed, an air valve disposed in said conduit intermediate the inlet and outlet and adapted to admit air into the conduit, and a pump communicating in said conduit intermediate the air valve and the dispensing outlet.

2. A device for aerating liquids in the course of dispensing a liquid, comprising a conduit member having an inlet opening adapted for submergence in a liquid supply and an outlet opening from which liquid may be dispensed, a one way air valve disposed in said conduit intermediate the inlet and outlet and adapted to admit air into the conduit, and a pump communicating in said conduit intermediate the air valve and the dispensing outlet.

3. A device for aerating liquids in the course of dispensing a liquid, comprising a conduit member having an inlet opening adapted for submergence in a liquid supply and an outlet opening from which liquid may be dispensed, an air valve disposed in said conduit intermediate the inlet and outlet and adapted to admit air into the conduit, a pump communicating in said conduit intermediate the air valve and the dispensing outlet, a power means adapted for actuating said pump, braking means associated with the power means, and a single means selectively adapted for actuating the power means and releasing the braking means simultaneously and for disconnecting the power means and setting the braking means simultaneously.

4. In an apparatus for dispensing a liquid from a supply container and subjecting said liquid to an aerating treatment during the dispensing operation, comprising a conduit connecting said supply container with another container, means communicating with said conduit for inducing a flow of the liquid from said supply container to said other container, and another means communicating with said conduit and responsive to the first said means for supplying a predetermined amount of air in said conduit during the flow of liquid therethrough, the first said means being adapted to agitate the mixture of liquid and air passing therethrough, whereby said liquid is delivered to said other container in a thoroughly aerated condition.

5. An apparatus for mixing and dispensing a liquid, comprising a conduit having an inlet opening adapted for submergence in a liquid supply and an outlet from which liquid may be dispensed, a geared pump interposed in said conduit having an inlet and an outlet, an air valve in said conduit adjacent the inlet of said pump, and means for regulating the amount of air entering said conduit in response to the flow of said liquid through said pump.

6. An apparatus for mixing and dispensing a liquid, comprising a conduit having an inlet opening adapted for submergence in a liquid supply and an outlet from which liquid may be dispensed, a geared pump interposed in said conduit having an inlet and an outlet, an air valve in said conduit adjacent the inlet of said pump, means for regulating the amount of air entering said conduit in response to the flow of said liquid through said pump, a power means for driving said pump, means for energizing said power means, means normally rendering said power means inoperable, and a single means for energizing said power means and releasing the means normally rendering said power means inoperable.

7. An apparatus for dispensing a liquid and subjecting the liquid to a treatment during the dispensing operation, comprising a liquid supply source, a conduit having an inlet opening adapted for submergence in said liquid supply and an outlet opening from which liquid may be dispensed, a geared pump interposed in said conduit for inducing a flow of the liquid through said conduit, an air valve communicating with said conduit and responsive to said pump for admitting a predetermined amount of air in said conduit during the flow of said liquid therethrough, means for agitating the liquid supply, power means for simultaneously operating said pump and said agitating means, braking means normally rendering said power means inoperable, means for energizing said power means, and a single means for releasing said braking means and energizing said power means simultaneously.

8. A claim in accordance with claim 7, wherein the outlet of said conduit is provided with a dispensing nozzle comprising a chamber therein, an opening in the walls of said chamber for receiving the outlet of said conduit, said nozzle terminating in an elongated tubular member, a wall disposed between the said chamber and said tubular member, said wall having an inclined passageway therethrough for connecting said chamber with said elongated tubular member.

9. An apparatus for dispensing a liquid from a supply container and subjecting said liquid to an aerating treatment during the dispensing operation, comprising a conduit connecting said supply container with another container, means communicating with said conduit for inducing a flow of the liquid from said supply container to said other container, and another means communicating with said conduit and responsive to the first said means for supplying a fluid in said conduit, the said fluid adapted to aerate and cool the liquid passing therethrough.

10. A device for aerating liquids in the course of dispensing a liquid, comprising a conduit having an inlet opening adapted for submergence in a liquid supply and an outlet opening from which liquid may be dispensed, means associated with said conduit intermediate the inlet and outlet, said means adapted to admit a fluid to said conduit, and another means communicating with said conduit intermediate the last said means and said outlet, the second said means adapted to induce the flow of said liquid through said conduit and to cooperate with said fluid for thoroughly aerating the liquid during the dispensing operation.

11. A device for aerating liquids in the course of dispensing a liquid, comprising a conduit member having an inlet opening adapted for submergence in a liquid supply and an outlet opening from which liquid may be dispensed, a pump communicating in said conduit intermediate said inlet opening and outlet opening and adapted to induce a flow of liquid through said conduit, and means communicating with said conduit intermediate said inlet opening and said outlet opening for admitting air into said conduit in response to the flow of liquid therethrough.

12. A device for aerating liquid in the course of dispensing a liquid, comprising a conduit member having an inlet opening adapted for submergence in a liquid supply and an outlet opening from which liquid may be dispensed, means disposed in said conduit intermediate the inlet and outlet for admitting air into said conduit, and a pump communicating in said conduit intermediate said inlet and outlet opening.

13. A device for aerating liquid in the course of dispensing a liquid, comprising a conduit member having an inlet opening adapted for submergence in a liquid supply and an outlet opening from which liquid may be dispensed, means communicating with said conduit intermediate said inlet and outlet for inducing a flow of liquid therethrough, and another means communicating with said conduit intermediate said inlet and outlet for admitting air into said conduit in response to the flow of liquid through said conduit.

HOSMER L. BLUM.